United States Patent [19]

Yamamoto et al.

[11] Patent Number: 4,654,318

[45] Date of Patent: Mar. 31, 1987

[54] PROCESS FOR PREPARING CATALYST COMPONENT FOR POLYMERIZATION OF OLEFINS

[75] Inventors: Tadashi Yamamoto; Masafumi Imai; Hiroyuki Furuhashi; Hiroshi Ueno; Naomi Inaba, all of Saitama, Japan

[73] Assignee: Toa Nenryo Kogyo Kabushiki Kaisha, Tokyo, Japan

[21] Appl. No.: 705,770

[22] Filed: Feb. 26, 1985

[30] Foreign Application Priority Data

Feb. 28, 1984 [JP] Japan .................. 59-35183

[51] Int. Cl.[4] .............................................. C08F 4/64
[52] U.S. Cl. .................................... 502/119; 502/121; 502/122; 502/123; 502/124; 502/125; 502/126; 502/127; 502/133; 526/124
[58] Field of Search ............... 502/119, 121, 122, 123, 502/124, 125, 126, 127, 133

[56] References Cited

U.S. PATENT DOCUMENTS

| | | | |
|---|---|---|---|
| 3,135,809 | 6/1964 | Bosmajian | 502/114 X |
| 4,115,319 | 9/1978 | Lociani et al. | 502/115 |
| 4,144,390 | 3/1979 | Derroitte et al. | 526/125 |
| 4,159,256 | 6/1979 | Sakurai et al. | 502/116 |
| 4,159,963 | 7/1979 | Sakurai et al. | 502/116 |
| 4,159,965 | 7/1979 | Sakurai et al. | 502/116 |
| 4,218,339 | 8/1980 | Zucchini et al. | 502/111 |
| 4,242,479 | 12/1980 | Yokota et al. | 526/124 |
| 4,250,287 | 2/1981 | Matlack | 502/119 X |
| 4,324,690 | 4/1982 | Karayannis et al. | 502/125 X |
| 4,330,650 | 5/1980 | Sakurai et al. | 526/127 |
| 4,431,568 | 2/1984 | Miya et al. | 502/125 X |
| 4,464,478 | 8/1984 | Slata et al. | 502/127 X |
| 4,472,521 | 9/1984 | Band | 502/119 X |

FOREIGN PATENT DOCUMENTS

| | | |
|---|---|---|
| 49467 | 4/1982 | European Pat. Off. |
| 98076 | 8/1977 | Japan |
| 43094 | 4/1978 | Japan |
| 36203 | 3/1980 | Japan |
| 168308 | 11/1980 | Japan |
| 155205 | 12/1981 | Japan |
| 92009 | 6/1985 | Japan |

Primary Examiner—Patrick P. Garvin
Attorney, Agent, or Firm—M. B. Kurtzman

[57] ABSTRACT

A process for preparing a catalyst component for the polymerization of olefins which comprises the steps of contacting (a) a magnesium dialkoxide soluble in an inert solvent, (b) a silicon compound having the hydrogen-silicon bond, and (c) an electron donor compound with one another in the presence of an inert solvent, and contacting the resulting reaction product with (d) a titanium compound.

16 Claims, No Drawings

PROCESS FOR PREPARING CATALYST COMPONENT FOR POLYMERIZATION OF OLEFINS

FIELD OF THE TECHNOLOGY

The present invention relates to a process for preparing a catalyst component for the polymerization of olefins, and more particularly, to a process for preparing a catalyst component which provides in high yields olefin polymers having superior particle properties and high stereoregularity.

BACKGROUND TECHNOLOGY

There have been proposed many processes for the production of a solid catalyst component for the polymerization of olefins which is composed essentially of magnesium, titanium, halogen, and an electron donor compound. The catalyst component produced by these processes has made it possible to produce in high yields polymers having considerably high stereoregularity. However, there still exists a demand for further improvement.

In the production of olefin polymers, it is important to regulate the particle shape of the polymer obtained. Recently, there has been proposed several methods for producing in high yields olefin polymers which have high stereoregularity and improved particle properties. For example, there is disclosed in U.S. Pat. No. 4,330,649 a process for producing an olefin polymer by using a catalyst component which is obtained by contacting a liquid magnesium compound having no reducing ability, a liquid titanium compound, and an electron donor compound having no active hydrogen with one another in the liquid state. This process has an advantage over the conventional technology; yet it is not satisfactory.

There is disclosed in Japanese Patent Laid-open No. 92009/1982 a catalyst component for the polymerization of olefins which is produced by contacting a magnesium compound, an electron donor compound, a silicon compound having the Si-H bond, and a titanium halide with one another. The magnesium compound used in the disclosed invention is substantially insoluble in an inert solvent; therefore, it is impossible to contact the magnesium compound with an electron donor compound and/or silicon compound in the liquid state. Thus the resulting catalyst component is low in catalytic activity and provides a polymer having low stereoregularity and unsatisfactory particle properties.

There is disclosed in Japanese Patent Laid-open No. 36203/1980 a catalyst component which is produced by contacting a hydrocarbon-soluble organomagnesium component or a reaction product thereof with a complex, with a chlorosilane compound having the Si-H bond, and contacting the resulting solid with a titanium compound and an ester of carboxylic acid. The solid has the Mg-C bond having reducing ability, which is not formed when a magnesium dialkoxide is used in the present invention. The resulting catalyst component has low catalytic activity and provides polymers having unsatisfactory particle properties.

DISCLOSURE OF THE INVENTION

Object of the Invention

It is an object of this invention to provide a catalyst component which provides in high yields olefin polymers having superior particle properties and high stereoregularity.

The present inventors previously developed and have disclosed in U.S. patent application Ser. No. 481,197 filed Apr. 1, 1983 a catalyst component obtained by contacting a magnesium alkoxide, a silicon compound having the hydrogen-silicon bond, an electron donor compound, and a titanium compound with one another, said catalyst component providing in high yields olefin polymers having high stereoregularity. It has now been discovered that the object of this invention can be achieved when the magnesium alkoxide is replaced by a magnesium dialkoxide soluble in an inert solvent. This finding led to the present invention.

SUMMARY OF THE INVENTION

The gist of this invention resides in a process for preparing a catalyst component for the polymerization of olefins which comprises the steps of contacting (a) a magnesium dialkoxide soluble in an inert solvent, (b) a silicon compound having the hydrogen-silicon bond, and (c) an electron donor compound with one another in the presence of an inert solvent, and contacting the resulting reaction product with (d) a titanium compound.

Raw Materials for Preparation of Catalyst Component

(A) Magnesium Dialkoxide

The magnesium dialkoxide used in this invention is a compound which is soluble in an inert solvent. By "inert solvent" is meant a solvent which is inactive to a magnesium dialkoxide, a silicon compound having the hydrogen-silicon bond, and/or an electron donor compound when they are contacted with one another. Usually, it is a hydrocarbon or halogenated hydrocarbon. Examples of such an inert solvent include saturated aliphatic hydrocarbons such as pentane, hexane, heptane, octane, decane, dodecane, and tetradecane; saturated alicyclic hydrocarbons such as cyclopentane, cyclohexane, methylcyclopentane, methylcyclohexane, cyclooctane, and cyclodecane; aromatic hydrocarbons such as benzene, toluene, xylene, ethylbenzene, cumene, and cymene; petroleum solvents such as kerosene; and halogenated hydrocarbons such as carbon tetrachloride, dichloroethane, trichloroethane, trichloropropane, dichlorobutane, dichloropentane, dichlorohexane, dichloroctane, dichloropentane, dichlorohexane, dichloroctane, and chlorobenzene.

The magnesium dialkoxide used in this invention is one which is soluble in at least one of the above-mentioned inert solvents at normal temperature. It is represented by the formula $Mg(OR)(OR^1)$, where $R$ and $R^1$ are the same or different alkyl, cycloalkyl, aryl, alkenyl, or aralkyl groups, preferably alkyl or cycloalkyl group, most suitable alkyl group. Those magnesium dialkoxides having hydrocarbon groups of carbon number less than 7 are insoluble in the above-mentioned inert solvent. Thus it is necessary that the hydrocarbon groups in the magnesium dialkoxide should have a carbon number of at least 7 and side chains.

Preferred examples of magnesium dialkoxide include magnesium di-2-ethylhexyloxide, magnesium di-2-methylhexyloxide, magnesium di-2-ethylheptyloxide, magnesium di-2-methylheptyloxide, magnesium di-2-ethylpentyloxide, magnesium di-2-(methylethyl)pentyloxide, magnesium di-1-methylhexyloxide, magnesium di-1-ethylpentyloxide, magnesium di-1-propylbutoxide, magnesium di-1-methylheptyloxide, magnesium di-1-ethylhexyloxide, magnesium di-1-propylpentyloxide, magnesium di-1-dimethylpentyloxide, magnesium di-1-dimethylhexyloxide, magnesium di-1-dimethylheptyloxide, magnesium di-1-dimethyloctyloxide, magnesium di-1-methylnonyloxide, magnesium di-1-methylethylbutoxide, magnesium di-1-(methylethyl)pentyloxide, magnesium di-1-(methylethyl)hexyloxide, magnesium di-1-(methylethyl)heptyloxide, magnesium di-1-(methylethyl)octyloxide, magnesium di-1-diethylpropoxide, magnesium di-1-diethylpentyloxide, magnesium di-1-diethylhexyloxide, magnesium di-1-diethylheptyloxide, magnesium di-1-diethyloctyloxide, magnesium di-1-(ethylbutyl)pentyloxide, magnesium di-1-dibutylpentyloxide, magnesium di-1-methylcyclohexyloxide, magnesium di-1-methylcyclohexyloxide, magnesium di-1-methylcyclohexyloxide, and magnesium di-4-methylcyclohexyloxide. Preferable among them are magnesium di-2-ethylhexyloxide, magnesium di-1-methylhexyloxide, magnesium di-1-ethylpentyloxide, magnesium di-1-methylheptyloxide, and magnesium di-1-ethylhexyloxide.

These magnesium alkoxides may be commercial ones or may be prepared by known methods. For example, they may be prepared by reacting metallic magnesium or dihydrocarbyl magnesium with an alcohol represented by ROH or $R^1OH$ (R and $R^1$ are the same as defined above). Where metallic magnesium is used, a halogen such as iodine may be added to promote the reaction. They may also be prepared by the alkoxyl group interchange reaction in which a magnesium dialkoxide insoluble in an inert solvent is contacted with an alcohol having the same hydrocarbon group as the desired alkoxide has.

(B) Silicon Compound

Any silicon compound having the hydrogen-silicon bond can be used in this invention. It is represented by the formula $H_mR'_nSiX_r$ where R' is a hydrocarbon group, R"O- (R"=hydrocarbon group), $R^2R^3N$- ($R^2$ and $R^3$=hydrocarbon groups), or $R^4COO$- ($R^4$=hydrogen atom or hydrocarbon group); X is a halogen atom; m is 1 to 3; $0 \leq r < 4$, and $m+n+r=4$. The groups represented by R' may be the same or different when n is greater than 1.

The hydrocarbon groups represented by R', R", $R^1$, $R^2$, $R^3$, and $R^4$ include, for example, alkyl, alkenyl, cycloalkyl, aryl, and aralkyl of carbon number 1 to 16. The alkyl group includes methyl, ethyl, propyl, n-butyl, isobutyl, n-hexyl, n-octyl, 2-ethylhexyl, and n-decyl. The alkenyl group includes vinyl, allyl, isopropenyl, propenyl, and butenyl. The cycloalkyl group includes cyclopentyl and cyclohexyl. The aryl group includes phenyl, tolyl, and xylyl. The aralkyl group includes benzyl, phenetyl, and phenylpropyl.

Preferable among them are lower alkyl groups such as methyl, ethyl, propyl, isopropyl, n-butyl, isobutyl, and t-butyl, and aryl groups such as phenyl and tolyl.

X in the above formula denotes a halogen atom such as chlorine, bromine, and iodine. Preferable among them is chlorine.

Examples of the silicon compound include $HSiCl_3$, $H_2SiCl_2$, $H_3SiCl$, $HCH_3SiCl_2$, $HC_2H_5SiCl_2$, $H(t-C_4H_9)SiCl_2$, $HC_6H_5SiCl_2$, $H(CH_3)_2SiCl$, $H(i-C_3H_7)_2SiCl$, $H_2C_2H_5SiCl$, $H_2(n-C_4H_9)SiCl$, $H_2(C_6H_4CH_3)SiCl$, $HSi(CH_3)_3$, $HSiCH_3(OCH_3)_2$, $HSiCH_3(OC_2H_5)_2$, $HSi(OCH_3)_3$, $(C_2H_5)_2SiH_2$, $HSi(CH_3)_2(OC_2H_5)$, $HSi(CH_3)_2[N(CH_3)_2]$, $HSiCH_3(C_2H_5)_2$, $HSiC_2H_5(OC_2H_5)_2$, $HSiCH_3[N(CH_3)_2]_2$, $C_6H_5SiH_3$, $HSi(C_2H_5)_3$, $HSi(OC_2H_5)_3$, $HSi(CH_3)_2[N(C_2H_5)_2]$, $HSi[N(CH_3)_2]_3$, $C_6H_5CH_3SiH_2$, $C_6H_5(CH_3)_2SiH$, $(n-C_3H_7)_3SiH$, $HSiCl(C_6H_5)_2$, $H_2Si(C_6H_5)_2$, $HSi(C_6H_5)_2CH_3$, $(n-C_5H_{11}O)_3SiH$, $HSi(C_6H_5)_3$, and $(n-C_5H_{11})_3SiH$. Additional compounds include $(ClCH_2CH_2O)_2CH_3SiH$, $HSi(OCH_2CH_2Cl)_3$, $[H(CH_3)_2Si]_2O$, $[H(CH_3)_2Si]_2NH$, $(CH_3)_3SiOSi(CH_3)_2H$, $[H(CH_3)_2Si]_2C_6H_4$, $[H(CH_3)_2SiO_2]_2Si(CH_3)_2$, $[(CH_3)_3SiO]_2SiHCH_3$, $[(CH_3)_3SiO]_3SiH$, and $[Si(CH_3)(H)O]_5$. Preferable among them are those silicon halide compounds in which R' is a hydrocarbon, n is 0 to 2, and r is 1 to 3, as exemplified by $HSiCl_3$, $H_2SiCl_2$, $H_3SiCl$, $HCH_3SiCl_2$, $HC_2H_5SiCl_2$, $H(t-C_4H_9)SiCl_2$, $H_3SiCl$, $HCH_3SiCl_2$, $HC_2H_5SiCl_2$, $H(t-C_4H_9)SiCl_2$, $HC_6H_5SiCl_2$, $H(CH_3)_2SiCl$, $H(i-C_3H_7)_2SiCl$, $H_2C_2H_5SiCl$, $H_2(n-C_4H_9)SiCl$, $H_2(C_6H_4CH_3)SiCl$, and $HSiCl(C_6H_2)_2$. Most suitable among them are $HSiCl_3$, $HCH_3SiCl_2$, and $H(CH_3)_2SiCl$ and especially $HSiCl_3$.

(C) Electron Donor Compound

The electron donor compound used in this invention includes carboxylic acids, carboxylic acid anhydrides, carboxylate esters, carboxylic acid halides, alcohols, ethers, ketones, amines, amides, nitriles, aldehydes, alcoholates, phosphoamides, thioethers, thioesters, carbonate esters, and compounds of phosphorus, arsenic, or antimony attached to an organic group through a carbon or oxygen atom. Preferable among them are carboxylic acids, carboxylic acid anhydrides, carboxylate esters, halogenated carboxylic acids, alcohols, and ethers.

Examples of the carboxylic acids include aliphatic monocarboxylic acids such as formic acid, acetic acid, propionic acid, butyric acid, isobutyric acid, valeric acid, caproic acid, pivalic acid, acrylic acid, methacrylic acid, and crotonic acid; aliphatic dicarboxylic acids such as malonic acid, succinic acid, glutaric acid, adipic acid, sebacic acid, maleic acid, and fumaric acid; aliphatic oxycarboxylic acids such as tartaric acid; alicyclic carboxylic acids such as cyclohexane monocarboxylic acid, cyclohexene monocarboxylic acid, cis-1,2-cyclohexane dicarboxylic acid, and cis-4-methylcyclohexene-1,2-dicarboxylic acid; aromatic monocarboxylic acids such as benzoic acid, toluic acid, anisic acid, p-t-butylbenzoic acid, naphthoic acid, and cinnamic acid; and aromatic dicarboxylic acids such as phthalic acid, isophthalic acid, terephthalic acid, and naphthalic acid.

The carboxylic acid anhydrides are the acid anhydrides of the above-mentioned carboxylic acids.

The carboxylate esters that can be used are mono- or diesters of the above-mentioned carboxylic acids. Examples of the carboxylate esters include butyl formate, ethyl acetate, butyl acetate, isobutyl isobutyrate, propyl pivalate, isobutyl pivalate, ethyl acrylate, methyl methacrylate, methyl methacrylate, isobutyl methacrylate, diethyl malonate, diisobutyl malonate, diethyl succinate, dibutyl succinate, diisobutyl succinate, diethyl glutarate, dibutyl gluturate, diisobutyl glutarate, diisobutyl adipate, dibutyl sebacate, diethyl maleate, dibutyl maleate, diisobutyl maleate, monomethyl fumarate, diethyl fumarate, diisobutyl fumarate, diethyl tartrate, dibutyl tartrate, diisobutyl tartrate, ethyl cyclohexanecarboxylaten, methyl benzoate, ethyl benzoate, methyl p-toluate, ethyl p-t-butyl benzoate, ethyl p-anisate, ethyl alpha-naphthoate, isobutyl alpha-naphthoate, ethyl cinnamate, monomethyl phthalate, dibutyl phthalate, diisobutyl phthalate, dihexyl phthalate, dioctyl phthalate, di-2-ethylhexyl phthalate, diallyl phthalate, diphenyl phthalate, diethyl isophthalate, isobutyl isophthalate, diethyl terephthalate, dibutyl terephthlate, diethyl naphthlate, and dibutyl naphthalate.

The carboxylic acid halides that can be used are acid halides of the above-mentioned carboxylic acids. Their examples include acetic acid chloride, acetic acid bromide, acetic acid iodide, propionic acid chloride, butyric acid chloride, butyric acid bromide, butyric acid iodide, pivalic acid chloride, pivalic acid bromide, acrylic acid chloride, acrylic acid bromide, acrylic acid iodide, methacrylic acid chloride, methacrylic acid bromide, methacrylic acid iodide, crotonic acid chloride, malonic acid chloride, malonic acid bromide, succinic acid chloride, succinic acid bromide, glutaric acid chloride, glutaric acid bromide, adipic acid chloride, adipic acid bromide, sebacic acid chloride, sebacic acid bromide, maleic acid chloride, maleic acid bromide, fumaric acid chloride, fumaric acid bromide, tartaric acid chloride, tartaric acid bromide, cyclohexanecarboxylic acid chloride, cyclohexanecarboxylic acid bromide, 1-cyclohexanecarboxylic acid chloride, cis-4-methylcyclohexene carboxylic acid chloride, cis-4-methylcyclohexenecarboxylic acid bromide, benzoyl chloride, benzoyl bromide, p-toluic acid chloride, p-toluic acid bromide, p-anisic acid chloride, p-anisic acid bromide, alpha-naphthoic acid chloride, cinnamic acid chloride, cinnamic acid bromide, phthalic acid dichloride, phthalic acid dibromide, isophthalic acid dichloride, isophthalic acid dibromide, terephthalic acid dichloride, and naphthalic acid dichloride. Additional examples include dicarboxylic acid monoalkylhalides such as adipic acid monomethylchloride, maleic acid monoethylchloride, and maleic acid monomethylchloride.

The alcohols are represented by the formula $R^5OH$, where $R^5$ is an alkyl, alkenyl, cycloalkyl, aryl, or aralkyl group of carbon number 1 to 12. Examples of the alcohols include methanol, ethanol, propanol, isopropanol, butanol, isobutanol, pentanol, hexanol, octanol, 2-ethylhexanol, cyclohexanol, benzyl alcohol, allyl alcohol, phenol, cresol, xylenol, ethylphenol, isopropylphenol, p-t-butylphenol, and n-octylphenol.

The ethers are represented by the formula $R^5OR^6$, where $R^5$ and $R^6$ are alkyl, alkenyl, cycloalkyl, aryl, or aralkyl groups of carbon number 1 to 12, and $R^5$ and $R^6$ may be the same or different. Their examples include diethyl ether, diisopropyl ether, dibutyl ether, diisobutyl ether, diisoamyl ether, di-2-ethylhexyl ether, diallyl ether, ethylallyl ether, butylallyl ether, diphenyl ether, anisole, and ethylphenyl ether.

(D) Titanium Compound

The titanium compound used in this invention is a compound of divalent, trivalent, or tetravalent titanium. Examples of these compounds include titanium tetrachloride, titanium tetrabromide, trichloroethoxytitanium, trichlorobutoxytitanium, dichlorodiethoxytitanium, dichlorodibutoxytitanium, dichlorodiphenoxytitanium, chlorotriethoxytitanium, chlorotributoxytitanium, tetrabutoxytitanium, and titanium trichloride. Preferable among them are tetravalent titanium halides such as titanium tetrachloride, trichloroethoxytitanium, dichlorodibutoxytitanium, and dichlorodiphenoxytitanium. Particularly preferable is titanium tetrachloride.

Preparation of Catalyst Component

The catalyst component used in this invention is obtained by contacting a magnesium alkoxide (component A), a silicon compound having the hydrogen-silicon bond (component B), and an electron donor compound (component C) with one another in the presence of an inert solvent, and contacting the resulting reaction product with a titanium compound (component D).

(1) Contacting of Components A, B, and C

The contacting of the three components A, B, and C can be accomplished by (1) contacting component A and component B with each other, contacting the resulting contact product with component C, (2) contacting a mixture of component A and component C with component B, (3) contacting a mixture of component B and component C with component A, or (4) contacting component A, component B, and component C with one another simultaneously. Methods (1) to (3) are preferable. They are described in the following:

Method (1)

The contacting of component A with component B is accomplished by contacting them with each other in the presence of an inert solvent. The method for contacting includes (i) mixing and stirring component A and component B in the presence of an inert solvent, (ii) dropping with stirring a solution of component A in an inert solvent into a system containing component B in the presence or absence of an inert solvent, and (iii) dropping with stirring component B into a solvent of component A in an inert solvent. The method (ii) is preferable. More than one kind of inert solvent may be used. The solvent used for preparing the solution of component A may be different from that used for contacting with component B; but they should preferably be of the same kind.

One mol of component A is contacted with 0.5 to 10 mol, preferably 1 to 5 mol, of component B. The contacting is carried out at $-80°$ to $200°$ C. for 0.5 to 100 hours. Where a solvent solution of component A is dropped into a system containing component B, it is preferable that the dropping is performed at a temperature below room temperature, particularly at a low temperature in the neighborhood of 0° C., and the temperature is raised after the dropping is complete. This method provides a catalyst component having improved particle properties. The inert solvent may be used in an amount of 10 ml to 100 liters, preferably 100 ml to 10 liters, for 1 mol of component A.

The contact product of component A and component B is then contacted with component C by mixing and stirring them in the presence of an inert solvent. The contacting is carried out at 0° to 150°C. for 0.5 to 10 hours. The inert solvent is used in an amount of 10 ml to 100 liters, preferably 100 ml to 10 liters, for 1 mol of component A. Component C should preferably be used in an amount of 0.005 to 10 gram mol, particularly 0.01 to 1 gram mol, for 1 gram atom of magnesium in the contact product of component A and component B.

Method (2)

The mixture of component A and component C is contacted with component B by slowly dropping a solution of component A and component C in an inert solvent into a system containing component B at a temperature below room temperature, particularly at a low temperature in the neighborhood of 0° C., and the temperature is raised after the dropping is complete. This method provides a catalyst component of uniform particle size.

Method (3)

The mixture of component B and component C is contacted with component A by slowly dropping a solution of component A in an inert solvent into a system containing component B and component C at a temperature below room temperature, particularly at a low temperature in the neighborhood of 0° C., and the temperature is raised after the dropping is complete. This method provides a catalyst component of uniform particle size.

Component B is used in an amount of 0.5 to 10 mol, preferably 1 to 5 mol, and component C is used in an amount of 0.005 to 10 mol, preferably 0.01 to 1 mol, for 1 mol of component A. The inert solvent is used in an amount of 10 ml to 100 liters, preferably 100 ml to 10 liters, for 1 mol of component A. The contacting is performed at 0° to 200° C. for 0.1 to 100 hours excluding the time required for dropping the solution of component A in an inert solvent.

The reaction product obtained by the above-mentioned methods (1) to (3) is usually a solid. It is then contacted with a titanium compound (component D) after separation or without separation from the reaction system. Before contacting with component D, it may be washed with the above-mentioned solvent, particularly a hydrocarbon, with or without heating.

(2) Contacting with Component D

The contact product obtained in the above step (1) (designated as contact product A) is subsequently contacted with component D. The contacting may be accomplished by simply bringing them into contact with each other; but preferably by mixing and stirring both in the presence of a hydrocarbon such as hexane, heptane, octane, cyclohexane, benzene, toluene, and xylene.

Component D should be used in an amount of 0.1 gram mol or above, preferably 1 to 50 gram mol, for 1 gram atom of magnesium in the contact product A.

The contacting in the presence of a hydrocarbon should be carried out at 0° to 200° C. for 0.5 to 20 hours, preferably at 60° to 150° C. for 1 to 5 hours.

The contacting with component D should preferably be performed more than once. The second contact may be performed in the same way as mentioned above; but in the case where the first contact is performed in the presence of a hydrocarbon, the second contact should preferably be performed after the separation of the hydrocarbon, which may be followed by washing with a hydrocarbon, if required.

The solid substance obtained by the above method is washed, as required, with an inert hydrocarbon such as hexane, heptane, octane, cyclohexane, benzene, toluene, and xylene, followed by drying. Thus there is obtained the catalyst component.

The catalyst component obtained as mentioned above is made into a catalyst for the polymerization of olefins by combining it with an organic compound of Group I-III metals in the Periodic Table.

According to this invention, an organic compound of lithium, magnesium, calcium, zinc, or aluminum can be used. The preferred one is an organoaluminum compound represented by the formula $R^7_n AlX_{3-n}$, where $R^7$ is an alkyl or aryl group; X is a halogen atom, alkoxyl group, or hydrogen atom; and n is any number in the range of $1 \leq n \leq 3$. Preferred ones are alkyl aluminum compound and a mixture thereof or complex thereof having 1 to 18 carbon atoms, preferably 2 to 6 carbon atoms, such as trialkyl aluminum, dialkyl aluminum monohalide, monoalkyl aluminum dihalide, alkyl aluminum sesquihalide, dialkyl aluminum monoalkoxide, and dialkyl aluminum monohydride. Examples of such compound include trialkyl aluminum such as trimethyl aluminum, triethyl aluminum, tripropyl aluminum, triisobutyl aluminum, and trihexyl aluminum; dialkyl aluminum monohalide such as dimethyl aluminum chloride, diethyl aluminum chloride, diethyl aluminum bromide, diethyl aluminum iodide, and diisobutyl aluminum chloride; monoalkyl aluminum dihalide such as methyl aluminum dichloride, ethyl aluminum dichloride, methyl aluminum dibromide, ethyl aluminum dibromide, ethyl aluminum diiodide, and isobutyl aluminum dichloride; alkyl aluminum sesquihalide such as ethyl aluminum sesquichloride; dialkyl aluminum monoalkoxide such as dimethyl aluminum methoxide, diethyl aluminum ethoxide, diethyl aluminum phenoxide, dipropyl aluminum ethoxide, diisobutyl aluminum ethoxide and diisobutyl aluminum phenoxide; and dialyl aluminum hydride such as dimethyl aluminum hydride, diethyl aluminum hydride, diproyl aluminum hydride, and diisobutyl aluminum hydride.

Preferably among them are trialkyl aluminums, and most suitable among them are triethyl aluminum and triisobutyl aluminum. These trialkyl aluminums may be used in combination with other organoaluminum compounds such as commercially available diethyl aluminum chloride, ethyl aluminum dichloride, ethyl aluminum sesquichloride, diethyl aluminum ethoxide, or diethyl aluminum hydride, or a mixture or a complex thereof.

According to this invention, it is also possible to use an organoaluminum compound in which two or more aluminum atoms are bonded through an oxygen atom or a nitrogen atom. Examples of such compounds include those which are represented by the formulas $(C_2H_5)_2AlOAl(C_2H_5)_2$, $(C_4H_9)_2AlOAl(C_4H_9)_2$, and $(C_2H_5)_2AlNC_2H_5Al(C_2H_5)_2$.

Organic compound of other metals than aluminum include, for example, diethyl magnesium, ethyl magnesium chloride, diethyl zinc, $LiAl(C_2H_5)_4$, and $LiAl(C_7H_{15})_4$.

The organometallic compound is used in an amount of 1 to 2000 gram mol, preferably 10 to 700 gram mol, for 1 gram atom of titanium in the catalyst component. One or more kinds of organmetallic compounds may be used.

The catalyst for olefin polymerization which is composed of the catalyst component of this invention and the above-mentioned organometallic compound may further be combined with an electron donor compound and/or an organosilicon compound.

The electron donor compound for this purpose may be selected from the electron donor compounds used as component C for the preparation of the catalyst component of this invention. Preferable among them are carboxylate esters, alcohols, ethers, and ketones. The electron donor compound is used in an amount of 0.005 to 1.0 gram mol, preferably 0.01 to 0.5 gram mol, for 1 gram atom of metal in the organometallic compound.

The electron donor compound that can be used also includes a Lewis base having the steric hindrance (simply referred to as Lewis base hereinafter). It is a compound having a nitrogen atom or oxygen atom in the molecule.

Examples of the Lewis base include piperidine compounds such as 2,2,6.6-tetramethylpiperidine, 2,6-diisopropylpiperidine, 2,6-diisobutylpiperidine, 2,6-diisobutyl-4-methylpiperidine, 2,2,6-trimethylpiperidine, 2,2,6,6-tetraethylpiperidine, 1,2,2,6,6-pentamethylpiperidine, 2,2,6,6-tetramethyl-4-piperidyl benzoate, and bis(2,2,6,6-tetramethyl-4-piperidyl)sebacate; pyridine compounds such as 2,6-diisopropylpyridine, 2,6-diisobutylpyridine, and 2-isopropyl-6-methylpyridine; pyrrolidine compounds such as 2,2,5,5-tetramethylpyrrolidine, 2,5-diisopropylpyrrolidine, 2,2,5-trimethylpyrrolidine, 1,2,2,5,5-pentamethylpyrrolidine, and 2,5-diisobutylpyrrolidine; amine compounds such as diisopropylethylamine, t-butyldimethylamine, diphenylamine, and di-o-triethylamine; aniline compounds such as N,N-diethylaniline, and N,N-diisopropylaniline; ketone compounds such as o-tolyl-t-butylketone, methyl-2,6-di-t-butylphenylketone, and di-o-tolylketone; furan compounds such as 2,2,5,5-tetraethyltetrahydrofuran, and 2,2,5,5-tetramethyltetrahydrofuran; and pyran compounds such as 2,2,6,6-tetraethyltetrahydropyran and 2,2,6,6-tetramethyltetrahydropyran.

The Lewis base is used in an amount of 0.02 to 2.0 gram mol, preferably 0.05 to 0.8 gram mol, for 1 gram atom of metal in the organometallic compound. One or more kinds of Lewis base may be used. In addition, it may be combined with an electron donor compound. The combination with an electron donor compound results in a polymer having improved stereoregularity.

The organosilicon compound that can be combined with the above-mentioned catalyst for olefin polymerization is one which is represented by the formula $R_p{}^8SiX_m(OR^9)_n$, where $R^8$ and $R^9$ are the same or different hydrocarbon groups, X is a halogen atom, $0 \leq p < 4$, $0 \leq m < 4$, $0 < n \leq 4$, and $p+m+n=4$. The hydrocarbon groups include alkyl, alkenyl, cycloalkyl, aryl, and aralkyl groups. If p is 2 or above, $R^8$ may denote hydrocarbon groups of different kind. The halogen atom represented by X should preferably be a chlorine atom.

Examples of the organosilicon compound include tetramethoxysilane, tetraethoxysilane, tetrabutoxysilane, tetraisobutoxysilane, tetraphenoxysilane, tetra(p-methylphenoxy)silane, tetrabenzoyloxysilane, methyltrimethoxysilane, methyltriethoxysilane, methyltributoxysilane, methyltriphenoxysilane, ethyltriethoxysilane, ethyltriisobutyoxysilane, ethyltriphenoxysilane, butyltrimethoxysilane, butyltriethoxysilane, butyltributoxysilane, butyltriphenoxysilane, isobutyltriisobutoxysilane, vinyltriethoxysilane, allyltrimethoxysilane, phenyltrimethoxysilane, phenyltriethoxysilane, benzyltriphenoxysilane, methyltriallyloxysilane, dimethyldimethoxysilane, dimethyldiethoxysilane, dimethyldiisopropoxysilane, dimethyldibutoxysilane, dimethyldihexyloxysilane, dimethyldiphenoxysilane, diethyldiethoxysilane, diethyldiisobutoxysilane, diethyldiphenoxysilane, dibutyldiisopropoxysilane, dibutyldibutoxysilane, dibutyldiphenoxysilane, diisobutyldiethoxysilane, diisobutyldiisobutoxysilane, diphenyldimethoxysilane, diphenyldiethoxysilane, diphenyldibutoxysilane, dibenzyldiethoxysilane, divinyldiphenoxysilane, diallyldipropoxysilane, diphenyldiallyloxysilane, methylphenyldimethoxysilane, and chlorophenyldiethoxysilane. Preferable among them are ethyltriethoxysilane, vinyltriethoxysilane, phenyltrimethoxysilane, phenyltriethoxysilane, diphenyldimethoxysilane, methylphenyldimethoxysilane, and chlorophenyldiethoxysilane.

The silicon compound is used in an amount of 0.02 to 2.0 gram mol, preferably 0.05 to 0.8 gram mol, for 1 gram atom of metal in the organometallic compound. One or more kinds of silicon compound may be used.

The electron donor compound (including Lewis base) and/or the organosilicon compound may be used simultaneously with the catalyst component and organometallic compound, or may be used after the preliminary contacting with the organometallic compound.

The polymerization catalyst prepared as mentioned above is useful as a catalyst for homopolymerization of monoolefins or copolymerization of a monoolefin with other monoolefin or diolefin. It is particularly suitable for homopolymerization of alpha-olefin, particulaly alpha-olefin of carbon number 3 to 6 such as propylene, 1-butene, 4-methyl-1-pentene, and 1-hexene. It is also suitable for random or block copolymerization of alpha-olefins or an alpha-olefin and ethylene. In addition, it is useful for homopolymerization of ethylene and for random or block copolymerization of ethylene and an alpha-olefin or carbon number 3 to 10 as exemplified above.

The polymerization may be performed either in gas phase or liquid phase. The liquid phase polymerization may be accomplished in an inert hydrocarbon such as n-butane, isobutane, n-pentane, isopentane, hexane, heptane, octane, cyclohexane, benzene, toluene, and xylene, or in the liquid monomer. The polymerization temperature is usually $-80°$ C. to $+150°$ C., preferably $40°$ to $120°$ C. The polymerization pressure is 1 to 60 atm. The molecular weight modification of the resulting polymer is accomplished in the presence of hydrogen or other known molecular weight modifier. In the copolymerization of olefins, the quantity of other olefin to be copolymerized is usually less than 30 wt%, particulaly 0.3 to 15 wt%, based on the olefin. The polymerization with the catalyst system of this invention may be performed continuously or batchwise under the commonly used conditions. The copolymerization may be performed in one stage or in two stages.

EFFECT OF INVENTION

When applied to polymerization of olefins, particularly alpha-olefins, the catalyst component prepared according to the process of this invention provides in high yields olefin polymers having high stereoregularity. The polymer powder thus produced has a high bulk density and a narrow particle size distribution.

EXAMPLES

The invention is described in more detail with reference to the following examples and application examples. The scope of this invention is not limited by the examples. Percent (%) in the examples and application examples means wt%, unless otherwise indicated.

The specific surface area (SA) and pore volume (PV) of the catalyst component were measured by using Sorptomatic 1810, made by Carlo Erba Co., Ltd.

The polymerization activity Kc is the quantity (g) of polymer formed per gram of the catalyst component, and the polymerization activity Kt is the quantity (kg) of polymer formed per gram of titanium in the catalyst. The heptane insolubles (abbreviated as H.I.) indicate the ratio of crystalline fraction in the polymer, that is the quantity of polymer that remains undissolved when extracted with boiling n-heptane for 6 hours by using a Soxhlet extractor of improved type. The melt flow rate (MFR) was measured according to ASTM D-1238, and the bulk density was measured according to ASTM D-1895-69, Method A.

EXAMPLE 1

Preparation of Magnesium Dialkoxide

Into a 300-ml flask, with the atmosphere replaced with nitrogen, was charged 50 ml (32 mmol) of 10% solution of butylethyl magnesium in n-heptane (MAGALA BEM, a product of Texas Alkyls Co., Ltd. in U.S.) Then, a mixture of 10 ml (64 mmole) of 2-ethylhexanol and 20 ml of heptane was added dropwise with stirring at room temperature over 15 minutes. The flask was placed in an oil bath at 120° C., and the reactants were stirred at the reflux temperature of n-heptane for 1 hour to complete the reaction. Thus there was obtained a colorless transparent viscous solution of magnesium di-2-ethylhexyloxide (solution A).

Contacting with Trichlorosilane and Ethyl Benzoate

Into a 300-ml flask, with the atmosphere replaced with nitrogen, were charged 25 g (180 mmol) of trichlorosilane and 50 ml of n-heptane. To this flask was added dropwise a mixture of solution A and 2 ml of ethyl benzoate (14 mmol) with stirring at 0° C. over 1 hour. Upon completion of the dropwise addition, the reaction system was heated to 70° C. and stirring was continued for 6 hours to complete the reaction. The resulting white solid substance was washed three times with 100 ml of n-hexane at 65° C. and then twice with 100 ml of toluene at 65° C.

Contacting with Titanium Tetrachloride

To the solid component were added 40 ml of toluene and 60 ml of titanium tetrachloride, followed by stirring at 90° C. for 2 hours. The supernatant liquid was removed by decantation, and 40 ml of toluene and 60 ml of titanium tetrachloride were newly added, followed by stirring at 90° C. for 2 hours. The resulting solid substance was filtered off at 90° C. and washed with seven 100-ml portions of hexane at 65° C., followed by drying at 60° C. for 30 minutes under reduced pressure. Thus there was obtained catalyst component A containing 2.5% of titanium, 2.7% of silicon, 19.0% of magnesium, 53.6% of chlorine, and 13.6% of ethyl benzoate. The catalyst component had a specific surface area of 190 $m^2/g$ and a pore volume of 0.17 cc/g.

EXAMPLE 2

Preparation of Magnesium Dialkoxide

Into a 300-ml glass reactor, with the atmosphere replaced with nitrogen, were charged 0.8 g (33 mmol) of magnesium powder, 100 ml of dodecane, 50 mg of iodine, and 10.4 ml (66 mmol) of 2-ethylhexanol, followed by stirring at 145° C. for 10 hours. After the reaction, there was obtained a colorless transparent viscous solution of magnesium di-2-ethylhexyloxide (solution B).

Preparation of Catalyst Component

Solution B was contacted with trichlorosilane, ethyl benzoate, and titanium tetrachloride in the same way as in Example 1. Thus there was obtained catalyst component B. Table 1 shows the composition and physical properties of catalyst component B.

EXAMPLE 3

Preparation of Magnesium Dialkoxide

Into a 300-ml glass reactor equipped with a distillation column, with the atmosphere replaced with nitrogen, were charged 3.8 g (33 mmol) of magnesium diethoxide, 200 ml of n-heptane, and 10.4 ml (66 mmol) of 2-ethylhexanol, followed by stirring at 80° C. for 10 hours. During the reaction, about 4 ml of ethanol was distilled away from the distillation column. After the reaction, there was obtained a colorless transparent viscous solution of magnesium di-2-ethylhexyloxide (solution C).

Preparation of Catalyst Component

Solution C was contacted with trichlorosilane, ethyl benzoate, and titanium tetrachloride in the same way as in Example 1. Thus there was obtained catalyst component C. Table 1 shows the composition and physical properties of catalyst component C.

EXAMPLES 4 to 6

Catalyst components D, E, and F were prepared in the same way as in Examples 1 to 3, respectively, except that ethyl benzoate was replaced by 3.7 ml (14 mmol) of diisobutyl phthalate. Table 1 shows the composition and physical properties of these catalyst components.

EXAMPLES 7 AND 8

Catalyst components G and H were prepared in the same way as in Example 4, except that trichlorosilane was replaced by 180 mmol of methyldichlorosilane (Example 7) and 180 mmol of dimethylchlorosilane (Example 8). Table 1 shows the composition and physical properties of these catalyst components.

EXAMPLE 9

Into a 300-ml flask, with the atmosphere replaced with nitrogen, were charged 25 g (180 mmol) of trichlorosilane and 50 ml of n-heptane. To this flask was added dropwise with stirring the solution A prepared in Example 1 at 0° C. over 1 hour. After the dropping, the reaction system was heated to 70° C. and stirring was continued for 4 hours. Then, 3.7 ml (14 mmol) of diisobutyl phthalate was added, and stirring was continued at 70° C. for 2 hours. After the reaction, the resulting solid component was washed three times with 100 ml of n-hexane at 65° C. and then twice with 100 ml of toluene at 65° C. The washed solid component was contacted with titanium tetrachloride in the same way as in Example 1 to give catalyst component I. Table 1 shows the composition and physical properties of this catalyst component.

EXAMPLES 10 TO 12

Example 1 was repeated, except that 2-ethylhexanol was replaced by 64 mmol each of 2-heptanol, 2-octanol, and 2-methyl-2-hexanol, respectively, to give solution of magnesium di-1-methylhexyloxide, magnesium di-1-methylheptyloxide, and magnesium di-1-dimethylpentyloxide, respectively. The magnesium dialkoxide solutions were contacted with trichlorosilane, diisobutylphthalate and titanium tetrachloride in the same way was in Example 4 to give catalyst components J, K, and L. Table 1 shows the composition and physical properties of these catalyst components.

EXAMPLES 13 TO 18

Example 1 was repeated, except that ethyl benzoate was replaced by 14 mmol each of benzoic acid anhydride, benzoyl chloride, diethyl phthalate, phthalic acid-di-chloride, phthalic acid anhydride, and n-butyl maleate, respectively, to give catalyst components M to R, respectively. Table 1 shows the composition and physical properties of these catalyst components.

COMPARATIVE EXAMPLE 1

Into a 300-ml four-neck flask, with the atmosphere replaced with nitrogen, was charged 100 ml of titanium tetrachloride. To this flask was added, while keeping the content at 0° C., a mixture of magnesium di-2-ethylhexyloxide solution prepared in the same was as in Example 1 and 3.7 ml of diisobutyl phthalate, with stirring over 1 hour. The reaction system was heated to room temperature with stirring over 1 hour and then to 90° C. over 1 hour. Reaction was continued for 2 hours. After the reaction, the supernatant solution was removed by decantation, and 40 ml of toluene and 60 ml of titanium tetrachloride were newly added, followed by stirring at 90° C. for 2 hours. The resulting solid substance was filtered off at 90° C. and washed with seven 100-ml portions of n-hexane at 65° C., followed by drying at 60° C. for 30 minutes under reduced pressure. Thus there was obtained catalyst component S containing 5.1% of titanium, 15.5% of magnesium, 43.6% of chlorine, and 12.9% of diisobutyl phthalate.

COMPARATIVE EXAMPLE 2

Catalyst component T was prepared in the same way as in Example 4, except that trichlorosilane was replaced by tetrachlorosilane. Table 1 shows the composition and physical properties of the catalyst component.

COMPARATIVE EXAMPLE 3

Into a 300-ml glass reactor, with the atmosphere replaced with nitrogen, was charged 100 ml of 10% solution of butylethyl magnesium in n-heptane. Then, a mixture of 18.2 of 2-ethylhexanol and 30 ml of n-heptane was added with stirring over 15 minutes. Stirring was continued at 80° C. for 2 hours to give a uniform solution. The solution was cooled to room temperature, and 1.3 g of phthalic acid anhydride was added. Treatment was performed at 100° C. for 1 hour, and the solution was cooled to room temperature. Thus there was obtained uniform solution (A).

Into a 500-ml glass reactor, with the atmosphere replaced with nitrogen, was charged 200 ml of titanium tetrachloride and the content was cooled to −20° C. While keeping this temperature, the uniform solution (A) was added dropwise with stirring over 1 hour. The reaction system was heated to 100° C., and 3.9 ml of diisobutyl phthalate was added. Reaction was carried out at 105° C. for 2 hours. While keeping this temperature, the supernatant liquid was removed by decantation. 200 ml of titanium tetrachloride was added, and reaction was carried out at 105° C. for 2 hours. After the reaction, the resulting solid substance was filtered off at 105° C. and washed with seven 250-ml portions of n-hexane at 65° C., followed by drying at 60° C. under reduced pressure. Thus there was obtained catalyst component U containing 3.0% of titanium, 16.5% of magnesium, 56.2% of chlorine, and 10.2% of diisobutyl phthalate.

COMPARATIVE EXAMPLE 4

Into a 400-ml four-neck flask, with the atmosphere replaced with nitrogen, were charged 3.8 g of magnesium diethoxide, 2 ml of ethyl benzoate, and 150 ml of n-heptane. Then, a solution composed of 25 g of trichlorosilane and 50 ml of n-heptane was added dropwise with stirring at 0° C. over 1 hour. After dropping, the reaction system was heated to 70° C. and stirring was continued for 6 hours to complete the reaction. The resulting solid substance was washed three times with 100 ml of n-hexane at 65° C. and then twice with 100 ml of toluene at 65° C. The washed solid substance was contacted with titanium tetrachloride in the same way as in Example 1 to give catalyst component V having the composition as shown in Table 1.

APPLICATION EXAMPLE 1

Polymerization of Propylene

Into a 1.5-liter stainless steel autoclave was charged under the nitrogen atmosphere a mixture formed by mixing, followed by standing for 5 minutes, 15 mg of catalyst component A prepared for Example 1, 2 ml of a solution containing 1 mol of TEAL (triethyl aluminum) in 1 liter of n-heptane (corresponding to 250 gram atom of aluminum for 1 gram atom of titanium in catalyst component A), and 1.3 ml of a solution containing 0.5 mol of EPA (ethyl p-anisate) in 1 liter of n-heptane (corresponding to 0.33 gram mol for EPA for 1 gram atom of aluminum in TEAL). Then, 750 ml of hydrogen as the molecular weight modifier and 1 liter of liquefied propylene were forced into the autoclave. The reaction system was heated to 70° C., and the polymerization of propylene was performed for 1 hour. After polymerization, unreacted propylene was purged. Thus there was obtained 158 g of white polypropylene powder having an HI of 94.7%, and MFR of 2.5, and a bulk density of 0.38 g/cc. Kc=10,500 and Kt=420. The polymer powder had the following particle size distribution:

| | |
|---|---|
| 840 m above 1.9% | 250 m above 15.4% |
| 590 m above 1.3% | 149 m above 64.0% |
| 420 m above 1.3% | 53 m above 11.0% |
| 350 m above 3.2% | 53 m above 1.9% |

APPLICATION EXAMPLES 2 AND 3

Polymerization of Propylene

The polymerization of propylene was carried out in the same way as in Application Example 1, except that the catalyst component A was replaced by the catalyst component B obtained in Example 2 and the catalyst component C obtained in Example 3, respectively. The results are shown in Table 2.

APPLICATION EXAMPLE 4

Polymerization of Propylene

The polymerization of propylene was carried out in the same way as in Application Example 1, except that the catalyst component A was replaced by the catalyst component D obtained in Example 4, the EPA solution was replaced by PES (phenyltriethoxysilane) solution in n-heptane, with PES being 0.1 gram mol for 1 gram atom of aluminum in TEAL, and the volume of hydrogen gas was changed to 100 ml. The results are shown in Tables 2 and 3.

APPLICATION EXAMPLES 5 TO 12

Polymerization of Propylene

The polymerization of propylene was carried out in the same way as in Application Example 4, except that the catalyst component D was replaced by the catalyst component E to L obtained in Examples 5 to 12, respectively. The results are shown in Table 2. The particle size distribution of the polymer powder obtained in Application Examples 7 and 10 is shown in Table 3.

APPLICATION EXAMPLES 13 AND 14

Polymerization of Propylene

The polymerization of propylene was carried out in the same way as in Application Example 1, except that the catalyst component A was replaced by the catalyst components M and N obtained in Examples 13 and 14, respectively. The results are shown in Table 2.

APPLICATION EXAMPLES 15 TO 18

Polymerization of Propylene

The polymerization of propylene was carried out in the same way as in Application Example 4, except that the catalyst component D was replaced by the catalyst components O to R obtained in Examples 15 to 18, respectively. The results are shown in Table 2. The particle size distribution of the polymer powder obtained in Application Examples 15 is shown in Table 3.

APPLICATION EXAMPLES 19 TO 20

Polymerization of Propylene

The polymerization of propylene was carried out in the same way as in Application Examples 4 and 7, respectively, except that 12.5 mg each of catalyst components D and G were used, 2.4 mmol each of TEAL was used, and PES was replaced by 0.8 mmol each of 2,2,6,6-tetramethyl piperidine. The results are shown in Table 2.

APPLICATION EXAMPLES 21 TO 23

Polymerization of Propylene

The polymerization of propylene was carried out in the same way as in Application Example 4, except that the catalyst component D was replaced by catalyst components S to U obtained in Comparative Examples 1 to 3, respectively. The results are shown in Table 2.

APPLICATION EXAMPLE 24

Polymerization of Propylene

The polymerization of propylene was carried out in the same way as in Application Example 1, except that the catalyst component V obtained in Comparative Example 4 was used.

| Kc = 8,700 | Kt = 242 | HI = 91.5 |
| --- | --- | --- |
| Bulk Density = 0.35 | | MFR = 2.9 |

The particle size distribution of the polymer powder is shown in Table 3.

APPLICATION EXAMPLE 25

Block Copolymerization of Propylene

Into a 3-liter autoclave, with the atmosphere replaced with nitrogen, were charged 15 mg of catalyst component D, 2.6 mmol of triethyl aluminum, and 0.26 mmol of phenyltriethoxysilane. Then, 200 ml of hydrogen gas and 2 liters of liquefied propylene were added. Homopolymerization was performed with stirring at 70° C. for 1 hour. (The polypropylene was found to have an HI of 96.8% by the analysis of polypropylene separately prepared under the same conditions as above.) When the polymerization was complete, unreacted propylene was discharged and the atmosphere in the autoclave was replaced with nitrogen. Then, a mixture gas of ethylene and propylene (ethylene/propylene = 1.5 molar ratio) was introduced into the autoclave at 1.5 atm. While keeping this pressure, copolymerization was carried out at 70° C. for 3 hours. When the polymerization was complete, unreacted mixture gas was discharged. Thus there was obtained 197 g of propylene block copolymer.

The copolymer portion in the copolymer as calculated from the consumption of the mixture gas and the quantity of the copolymer formed was 16.1%. (This is referred to as value C hereinafter.) The ethylene content in the copolymer determined by IR spectroscopy was 7.7%. This means that the ethylene content in the copolymer portion is 48%. (This is referred to as value G hereinafter.) Calculations from the quantity of the copolymer formed and the consumption of the mixture gas indicate that 1 g of the catalyst component D formed 13,100 g of propylene homopolymer (referred to as EH) and 3,500 g of the copolymer portion (referred to as Ec). The MFR of the copolymer was 2.1 g/10 min, and the bulk density was 0.39 g/cc. No fouling occurred in the autoclave, and no agglomeration was found in the polymer particles.

APPLICATION EXAMPLES 26 AND 27

Block Copolymerization of Propylene

The block copolymerization of propylene was carried out in the same way as in Application Example 25, except that catalyst component D was replaced by catalyst component G and catalyst component J, respectively. The results are shown in the following:

| Catalyst component | HI of homopolymer | EH | Ec | Value C | Value G | MFR | Ethylene content |
| --- | --- | --- | --- | --- | --- | --- | --- |
| G | 96.7 | 13,400 | 3,500 | 14.8 | 50 | 2.7 | 7.4 |
| J | 97.0 | 14,000 | 3,700 | 14.0 | 49 | 2.4 | 6.9 |

APPLICATION EXAMPLE 28

Random Copolymerization of Propylene

The random copolymerization of ethylene and propylene was carried out in the same way as in Application Example 4, except that 1.5 g of ethylene was forced into the autoclave in six portions at intervals of 10 minutes.

Kc = 19,700 and Kt = 480. The bulk density of the copolymer was 0.37 g/cc. The ethylene content in the copolymer determined by IR spectroscopy was 3.0%. The melting point and crystallization point of the copolymer determined by a differential scanning calorimeter were 144° C. and 99° C., respectively.

TABLE 1

| Example | Catalyst component | Composition Ti | Mg | Cl | Si | ED* | SA m²/g | PV cc/g |
|---|---|---|---|---|---|---|---|---|
| 2 | B | 2.1 | 19.1 | 57.7 | 2.1 | 10.5 | 168 | 0.14 |
| 3 | C | 2.4 | 18.3 | 59.2 | 2.5 | 13.2 | 172 | 0.15 |
| 4 | D | 4.1 | 15.4 | 57.3 | 1.2 | 18.2 | 195 | 0.16 |
| 5 | E | 3.8 | 14.5 | 52.9 | 1.1 | 16.1 | 152 | 0.14 |
| 6 | F | 4.5 | 15.2 | 49.8 | 1.1 | 17.2 | 170 | 0.15 |
| 7 | G | 4.9 | 14.9 | 52.0 | 1.1 | 16.5 | 164 | 0.15 |
| 8 | H | 3.9 | 14.8 | 48.6 | 1.0 | 18.1 | 211 | 0.19 |
| 9 | I | 4.5 | 15.6 | 49.2 | 0.8 | 18.2 | | |
| 10 | J | 4.5 | 15.2 | 47.0 | 0.9 | 15.2 | | |
| 11 | K | 4.5 | 14.6 | 53.6 | 1.3 | 16.0 | | |
| 12 | L | 4.6 | 16.0 | 50.5 | 1.1 | 16.9 | | |
| 13 | M | 2.0 | 19.2 | 59.1 | 2.1 | 5.9 | | |
| 14 | N | 3.1 | 17.6 | 60.5 | 1.9 | | | |
| 15 | O | 4.2 | 14.8 | 52.0 | 1.1 | 13.2 | | |
| 16 | P | 5.6 | 14.7 | 50.8 | 0.9 | | | |
| 17 | Q | 3.9 | 15.6 | 53.5 | 0.8 | 11.4 | | |
| 18 | R | 3.8 | 15.4 | 49.7 | 1.3 | 9.8 | | |
| 2** | T | 5.0 | 15.1 | 47.2 | 0.1 | 13.6 | | |
| 4** | V | 3.6 | 17.6 | 59.2 | 0.9 | 4.6 | 58 | 0.06 |

*Electron donor compound
**Comparative Examples

TABLE 2

| Application Example | Catalyst component | Kc (g/g-cat) | Kt (kg/g-Ti) | HI (%) | Bulk density (g/cc) | MFR (g/10 min) |
|---|---|---|---|---|---|---|
| 2 | B | 10,000 | 476 | 94.9 | 0.38 | 2.0 |
| 3 | C | 11,100 | 462 | 94.5 | 0.37 | 3.1 |
| 4 | D | 16,500 | 402 | 96.9 | 0.42 | 4.2 |
| 5 | E | 14,900 | 392 | 96.9 | 0.41 | 3.8 |
| 6 | F | 17,000 | 378 | 97.0 | 0.42 | 4.3 |
| 7 | G | 16,200 | 330 | 96.7 | 0.45 | 4.2 |
| 8 | H | 16,000 | 410 | 96.4 | 0.43 | 4.5 |
| 9 | I | 17,500 | 389 | 96.5 | 0.42 | 4.2 |
| 10 | J | 15,800 | 351 | 97.0 | 0.42 | 4.1 |
| 11 | K | 17,200 | 382 | 96.8 | 0.42 | 4.9 |
| 12 | L | 16,400 | 357 | 96.6 | 0.41 | 4.7 |
| 13 | M | 9,800 | 490 | 94.2 | 0.37 | 2.1 |
| 14 | N | 10,200 | 329 | 94.4 | 0.37 | 1.9 |
| 15 | O | 13,800 | 329 | 96.5 | 0.40 | 4.5 |
| 16 | P | 14,900 | 266 | 96.4 | 0.40 | 2.9 |
| 17 | Q | 12,700 | 326 | 96.5 | 0.41 | 3.5 |
| 18 | R | 11,500 | 303 | 96.1 | 0.39 | 4.6 |
| 19 | D | 27,600 | 673 | 95.6 | 0.42 | 0.81 |
| 20 | G | 29,800 | 608 | 95.4 | 0.41 | 1.0 |
| 21 | S | 4,500 | 88 | 93.7 | 0.24 | 4.2 |
| 22 | T | 8,700 | 174 | 90.5 | 0.21 | 3.9 |
| 23 | U | 3,000 | 100 | 92.6 | 0.33 | 2.4 |

TABLE 3

| Particle size (μm) | Application Example No. 4 | 7 | 10 | 15 | 24 |
|---|---|---|---|---|---|
| 840 up | 0.5 | 1.9 | 2.1 | 0.6 | 22.9 |
| 590 up | 1.0 | 1.6 | 1.5 | 0.9 | 6.3 |
| 420 up | 1.5 | 3.2 | 5.6 | 1.6 | 17.4 |
| 350 up | 4.5 | 15.9 | 20.8 | 6.3 | 12.5 |
| 250 up | 25.2 | 66.7 | 61.3 | 26.6 | 5.5 |
| 149 up | 59.1 | 7.7 | 8.4 | 61.4 | 7.6 |
| 53 up | 8.1 | 2.9 | 0.3 | 2.5 | 12.5 |
| 53 below | 0.1 | 0.1 | 0.1 | 0.1 | 6.3 |

What is claimed is:

1. A catalyst component comprising: A titanium containing catalyst component obtained by contacting (i) Component A, a magnesium dialkoxide soluble in inert solvents represented by the formula Mg(OR)(OR$^1$) wherein R and R$^1$ are the same or different branched alkyls or alkyl substituted cycloalkyls, each R and R$^1$ having 7 or more carbon atoms, (ii) Component B, a silicon compound having a hydrogen-silicon bond (iii) Component C, an electron donor compound, and (iiii) a titanium compound with the proviso that Component A, B and C are contacted with one another in an inert solvent prior to contact with the titanium compound.

2. The catalyst component of claim 1 wherein the silicon compound is selected from trichlorosilane, methyldichlorosilane and dimethylchlorosilane.

3. The catalyst component of claim 1 wherein the magnesium alkoxide is selected from magnesium di-2-ethylhexyloxide, magnesium di-1-methylhexyloxide, magnesium di-1-ethylpentyloxide, magnesium di-1-methylheptyloxide, and magnesium di-1-ethylhexyloxide.

4. The catalyst component of claim 1 wherein the electron donor compounds are selected from ethyl benzoate, diisobutylphthalate, benzoic acid anhydride, benzoyl chloride, diisobutylphthalate, phalic acid-di-chloride, phthalic acid anhydride and n-butylmaleate.

5. The catalyst component of claim 1 wherein Component A is magnesium di-2-ethylhexyloxide, component B is trichlorosilane and Component C is ethylbenzoate.

6. An olefin polymerization catalyst comprising the catalyst component of claim 1 and an organo metal compound of Groups I-III metals of the Periodic Table.

7. An olefin polymerization catalyst comprising the catalyst component of claim 2 and an organo metal compound of Groups I-III metals of the Periodic Table.

8. An olefin polymerization catalyst comprising the catalyst component of claim 3 and an organo metal compound of Groups I-III metals of the Periodic Table.

9. An olefin polymerization catalyst comprising the catalyst component of claim 4 and an organo metal compound of Groups I-III metals of the Periodic Table.

10. An olefin polymerization catalyst comprising the catalyst compound of claim 5 and an organo metal compound of Groups I-III metals of the Periodic Table.

11. The olefin polymerization catalyst of claim 6 wherein the cocatalyst is triethylaluminum.

12. The olefin polymerization catalyst of claim 6 which is further combined with an electron donor compound and/or an organosilicon compound.

13. The olefin polymerization catalyst of claim 12 wherein the electron donor is selected from ethyl benzoate and ethyl-p-anisate.

14. The olefin polymerization catalyst of claim 12 wherein the electron donor compound is a sterically hindered electron donor compound.

15. The olefin polymerization catalyst of claim 14 wherein the electron donor compound is 2,2,6,6-tetramethylpiperidine.

16. The olefin polymerization catalyst of claim 12 wherein the organo silicon compound is phenyltriethoxysilane.

* * * * *